United States Patent
Hasegawa et al.

(10) Patent No.: US 12,098,587 B2
(45) Date of Patent: Sep. 24, 2024

(54) GLASS PANEL UNIT AND GLASS WINDOW

(71) Applicant: PANASONIC INTELLECTUAL PROPERTY MANAGEMENT CO., LTD., Osaka (JP)

(72) Inventors: Kenji Hasegawa, Osaka (JP); Eiichi Uriu, Osaka (JP); Kazuya Hasegawa, Osaka (JP); Tasuku Ishibashi, Ishikawa (JP); Hiroyuki Abe, Osaka (JP); Masataka Nonaka, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 700 days.

(21) Appl. No.: 17/283,858

(22) PCT Filed: Aug. 27, 2019

(86) PCT No.: PCT/JP2019/033553
§ 371 (c)(1),
(2) Date: Apr. 8, 2021

(87) PCT Pub. No.: WO2020/075406
PCT Pub. Date: Apr. 16, 2020

(65) Prior Publication Data
US 2021/0381302 A1 Dec. 9, 2021

(30) Foreign Application Priority Data

Oct. 12, 2018 (JP) .................................. 2018-193891

(51) Int. Cl.
*E06B 3/66* (2006.01)
*E06B 3/673* (2006.01)

(52) U.S. Cl.
CPC .......... *E06B 3/6612* (2013.01); *E06B 3/6621* (2013.01); *E06B 3/6733* (2013.01)

(58) Field of Classification Search
CPC ..... E06B 3/6612; E06B 3/6621; E06B 3/6733
See application file for complete search history.

(56) References Cited

U.S. PATENT DOCUMENTS

| | | | |
|---|---|---|---|
| 2009/0074997 A1* | 3/2009 | Stark | E06B 3/66304 428/34 |
| 2013/0187983 A1* | 7/2013 | Eron | B41J 11/00214 347/37 |

(Continued)

FOREIGN PATENT DOCUMENTS

| | | |
|---|---|---|
| JP | 2002-179439 A | 6/2002 |
| JP | 2007-078870 A | 3/2007 |

(Continued)

OTHER PUBLICATIONS ip.com translation of JP2016147806A (Year: 2023).*

(Continued)

Primary Examiner — Michael Zhang
(74) Attorney, Agent, or Firm — Rimon P.C.

(57) ABSTRACT

A glass panel unit includes: a first panel including a glass pane; a second panel including another glass pane; a sealing portion; an exhaust port; and a printed portion. The second panel is arranged to face the first panel. The sealing portion is formed in a frame shape and hermetically bonds respective peripheral edge portions of the first and second panels to create an evacuated, hermetically sealed space between the first panel and the second panel. The exhaust port is provided for one panel selected from the first and second panels. A port sealing member hermetically seals the exhaust port. The printed portion is provided for the other panel selected from the first and second panels. The printed portion is located in an area, facing the exhaust port, of one (Continued)

surface of the other panel. The one surface either faces toward, or faces away from, the hermetically sealed space.

7 Claims, 11 Drawing Sheets

(56) References Cited

U.S. PATENT DOCUMENTS

| | | | |
|---|---|---|---|
| 2014/0335291 A1 | 11/2014 | Hasegawa et al. | |
| 2014/0356558 A1* | 12/2014 | Hasegawa | B32B 3/085 |
| | | | 428/34 |
| 2015/0345207 A1* | 12/2015 | Thompson | E06B 3/677 |
| | | | 52/204.6 |
| 2016/0001524 A1 | 1/2016 | Abe et al. | |
| 2016/0319587 A1* | 11/2016 | Petrmichl | E06B 9/24 |
| 2017/0217816 A1 | 8/2017 | Tian | |
| 2017/0226791 A1 | 8/2017 | Hasegawa et al. | |
| 2018/0290435 A1 | 10/2018 | Abe et al. | |
| 2019/0084877 A1* | 3/2019 | Abe | E06B 3/66342 |

FOREIGN PATENT DOCUMENTS

| | | | | |
|---|---|---|---|---|
| JP | 2014-214041 A | | 11/2014 | |
| JP | 2016147806 A * | | 8/2016 | B32B 17/06 |
| WO | 2014/136151 A1 | | 9/2014 | |
| WO | WO-2017169252 A1 * | | 10/2017 | B32B 17/06 |

OTHER PUBLICATIONS

International Search Report and Written Opinion issued in International Patent Application No. PCT/JP2019/033553, dated Nov. 19, 2019; with partial English translation.

\* cited by examiner

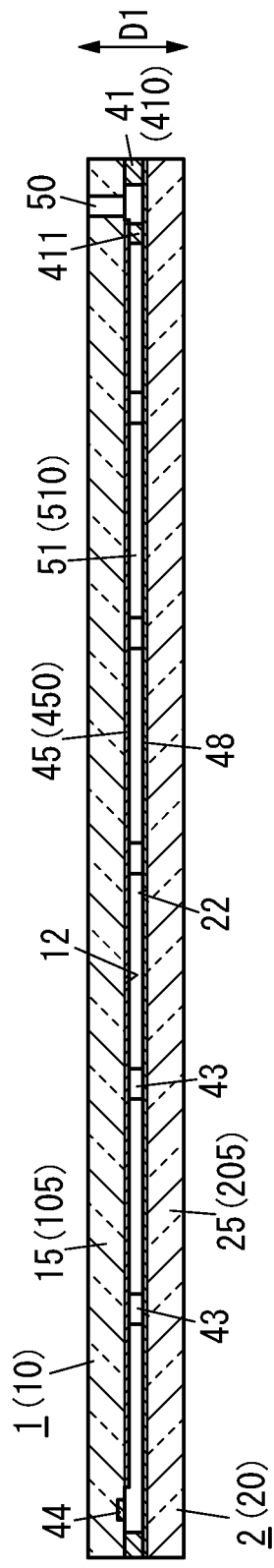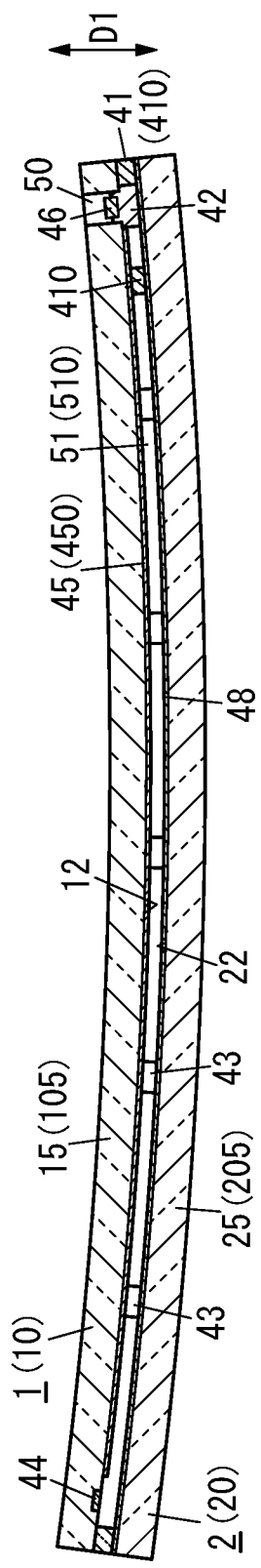

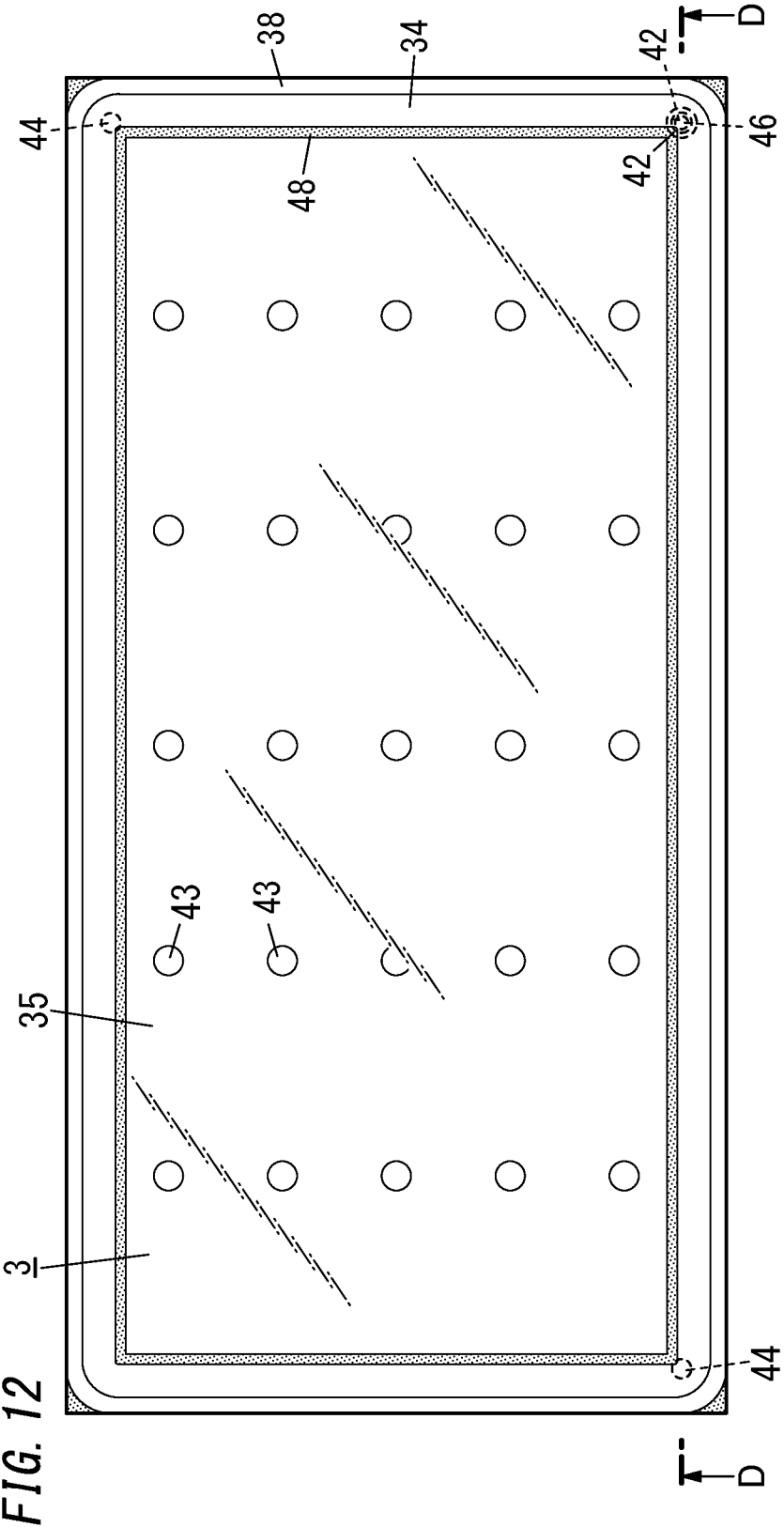
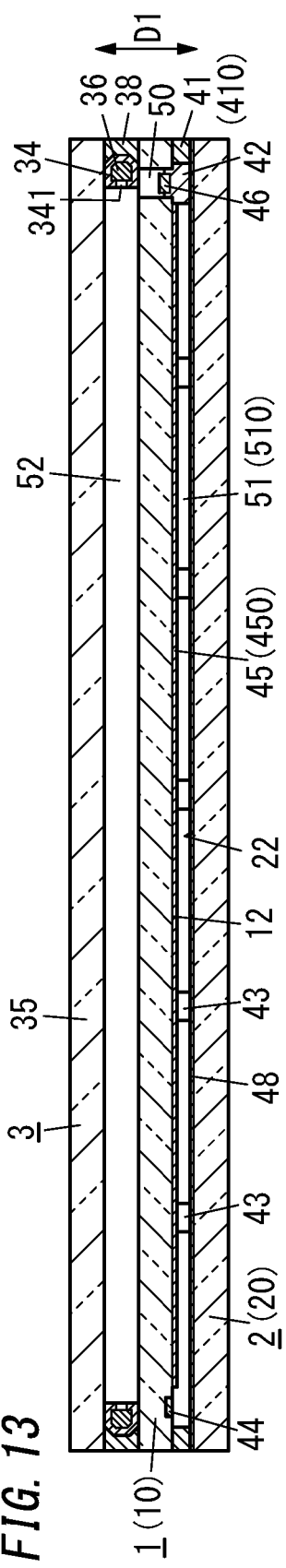
FIG. 12
FIG. 13

GLASS PANEL UNIT AND GLASS WINDOW

CROSS-REFERENCE OF RELATED APPLICATIONS

This application is the U.S. National Phase under 35 U.S.C. § 371 of International Patent Application No. PCT/JP2019/033553, filed on Aug. 27, 2019, which in turn claims the benefit of Japanese Application No. 2018-193891, filed on Oct. 12, 2018, the entire disclosures of which Applications are incorporated by reference herein.

TECHNICAL FIELD

The present disclosure generally relates to a glass panel unit and a glass window, and more particularly relates to a glass panel unit including a first panel, a second panel, and a frame-shaped sealing portion and a glass window.

BACKGROUND ART

Glass panel units with excellent thermal insulation properties have been proposed in the known art. For example, in a multi-pane glazing disclosed in Patent Literature 1, a sealant is interposed between a pair of glass panes. In this state, the whole assembly is heated to a temperature higher than a melting temperature of the sealant, thereby bonding the pair of glass panes together with the sealant thus melted. In this manner, a hermetically sealed space (internal space) is created between the pair of glass panes and the sealant.

Next, a gas is exhausted from the hermetically sealed space with the temperature of a melting furnace kept lower than the melting temperature of the sealant, thus activating an adsorbent. Thereafter, the hermetically sealed space is sealed up with the evacuated state maintained by a so-called "tip off" technique, by which a tip portion of an exhaust pipe, protruding from one of the glass panes, is melted to close its exhaust port and thereby seal the internal space.

In the known multi-pane glazing, however, the exhaust port is conspicuous through the other glass pane with no exhaust ports, thus marring its appearance, which is a problem with the known multi-pane glazing.

CITATION LIST

Patent Literature

Patent Literature 1: WO 2014/136151 A1

SUMMARY OF INVENTION

In view of the foregoing background, it is therefore an object of the present disclosure to provide a glass panel unit and a glass window, both of which are designed to make the exhaust port much less conspicuous when viewed through the glass pane with no exhaust ports.

A glass panel unit according to an implementation of the present disclosure includes: a first panel including a glass pane; a second panel including another glass pane; a sealing portion; an exhaust port; and a printed portion. The second panel is arranged to face the first panel. The sealing portion is formed in a frame shape and hermetically bonds respective peripheral edge portions of the first and second panels to create an evacuated, hermetically sealed space between the first panel and the second panel. The exhaust port is provided for one panel selected from the group consisting of the first and second panels. The printed portion is provided for the other panel selected from the group consisting of the first and second panels. The printed portion is located in an area, facing the exhaust port, of one surface of the other panel. The one surface either faces toward, or faces away from, the hermetically sealed space.

A glass window according to another implementation of the present disclosure includes the glass panel unit described above, and a window frame into which peripheral edge portions of the glass panel unit are fitted.

BRIEF DESCRIPTION OF DRAWINGS

FIG. 10 is a cross-sectional view thereof taken along the plane C-C shown in FIG. 9A;

FIG. 11 is a cross-sectional view of a glass panel unit according to a third embodiment;

FIG. 12 is a plan view of a glass panel unit according to a fourth embodiment;

FIG. 13 is a cross-sectional view thereof taken along the plane D-D shown in FIG. 12.

DESCRIPTION OF EMBODIMENTS

Figure 1:
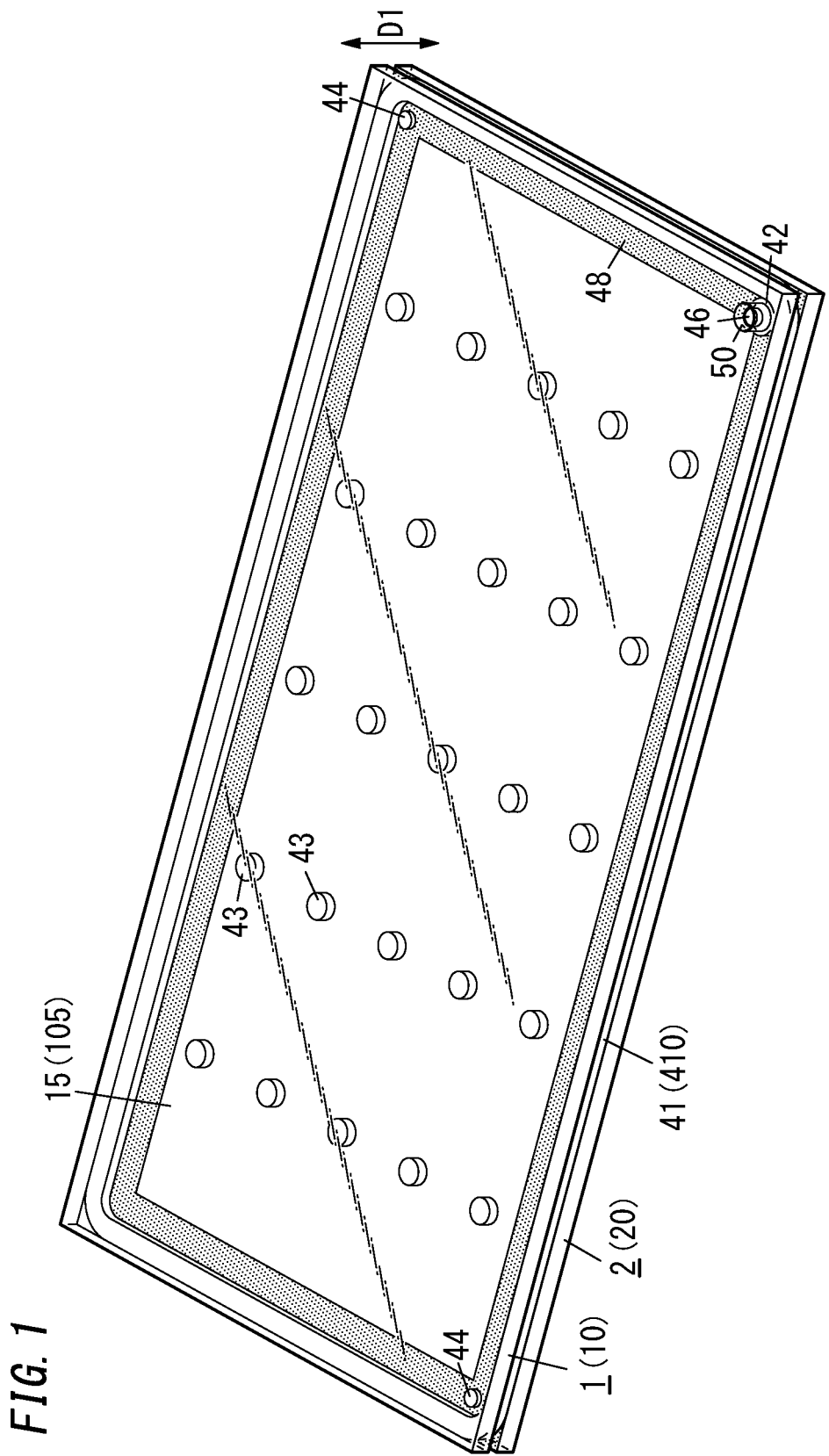
FIG. 1 is a perspective view illustrating a glass panel unit according to a first embodiment.

A glass panel unit and glass window according to the present disclosure will be described with reference to the accompanying drawings. Note that on those drawings, respective constituent members of a glass panel unit are depicted only schematically. That is to say, the dimensions and shapes of those constituent members illustrated on the drawings are different from actual ones.

(Glass Panel Unit)

First of all, a glass panel unit according to a first embodiment may be used as a glass panel unit for refrigerator showcases, for example. However, this is only an exemplary use of the present disclosure and should not be construed as limiting. The respective constituent elements of the glass panel unit according to the first embodiment will be described with reference to FIGS. 1-3.

The glass panel unit according to the first embodiment includes a first panel 1, a second panel 2, a sealing portion 41, a port sealing member 42, and a printed portion 48.

The first panel 1 and the second panel 2 are arranged to face each other with a narrow gap left between them. The first panel 1 and the second panel 2 are parallel to each other. Between the first panel 1 and the second panel 2, arranged are the sealing portion 41, a plurality of (multiple) pillars 43, and a gas adsorbent 44.

The first panel 1 includes a glass pane 15 and a low emissivity film 45 (see FIG. 3) stacked on the glass pane 15. The low emissivity film 45 is a film containing a metal with low emissivity such as silver and has the capability of reducing the transfer of heat due to heat radiation. The low emissivity film 45 is formed on one surface, facing toward a hermetically sealed space 51, of the glass pane 15. In the first embodiment, the low emissivity film 45 is implemented as a so-called "low-E film." The size of the glass pane 15 determines the size of the first panel 1. In the first embodiment, the glass pane 15 has a rectangular shape in a front view.

The second panel 2 includes a glass pane 25. The second panel 2 is arranged to face the first panel 1. The size of the glass pane 25 determines the size of the second panel 2. In the first embodiment, the glass pane 25 has a rectangular shape in a front view.

The size and shape of the glass pane 15 in a front view (i.e., the size and shape of the surface of the glass pane 15 as viewed perpendicularly to the surface of the glass pane 15) are the same as the size and shape of the glass pane 25 in a front view.

The glass pane 15 and the glass pane 25 may be configured as any of various types of glass panes made of soda lime glass, high strain point glass, chemically tempered glass, alkali-free glass, quartz glass, Neoceram, thermally tempered glass, or any other suitable glass.

Most of a counter surface 12, facing the second panel 2, of the first panel 1 (i.e., a surface facing toward the hermetically sealed space 51 as will be described later) is constituted of the surface of the low emissivity film 45. Most of a counter surface 22, facing the first panel 1, of the second panel 2 (i.e., another surface facing toward the hermetically sealed space 51) is constituted of the surface of the second glass pane 25. Note that in an area where the printed portion 48 is provided, that area is constituted of the surface of the printed portion 48.

The sealing portion 41 is formed in a frame shape and may be made of a material having a predetermined melting point (softening point) (such as glass frit with a low melting point in the first embodiment). The melting point (softening point) of the sealing portion 41 may be 265° C. in the first embodiment but is not limited to any particular value. The sealing portion 41 is located between the first panel 1 and the second panel 2 and is hermetically bonded to respective peripheral edge portions of the first and second panels 1 and 2. In other words, the respective peripheral edge portions of the first and second panels 1 and 2 are hermetically bonded together via the sealing portion 41.

The plurality of pillars 43 are dispersed so as to be spaced apart from each other. Each of the pillars 43 is arranged in contact with both of the respective counter surfaces 12 and 22 of the first and second panels 1 and 2.

The plurality of pillars 43 are arranged to be surrounded with the sealing portion 41 in the frame shape. The plurality of pillars 43 has the capability of keeping a predetermined gap distance between the first and second panels 1 and 2. The plurality of pillars 43 is suitably made of a resin such as polyimide either entirely or only partially.

The gas adsorbent 44 is provided on one surface, facing toward the hermetically sealed space 51, of either the first panel 1 or the second panel 2. In the first embodiment, the gas adsorbent 44 is provided on one surface, facing toward the hermetically sealed space 51, of the first panel 1.

The glass panel unit according to the first embodiment has an exhaust port 50. The exhaust port 50 is provided for one panel selected from the first panel 1 and the second panel 2. In the first embodiment, the exhaust port 50 is provided for the first panel 1, out of the first panel 1 and the second panel 2. The port sealing member 42 is made of a material having a predetermined melting point (softening point) (such as a glass frit according to the first embodiment). The melting point (softening point) of the port sealing member 42 may be 265° C. in the first embodiment but is not limited to any particular value. The exhaust port 50 is hermetically sealed with the port sealing member 42. The exhaust port 50 will be used to exhaust a gas in a process step (i.e., an evacuation step to be described later) during the manufacturing process of the glass panel unit. The exhaust port 50 penetrates through the first panel 1 in a thickness direction D1. As used herein, the "thickness direction D1" is defined along the thickness of the entire glass panel unit, the thickness of the first panel 1, and the thickness of the second panel 2.

The hermetically sealed space 51, surrounded with the first panel 1, the second panel 2, and the sealing portion 41, is entirely sealed hermetically by closing the exhaust port 50. The hermetically sealed space 51 may be a thermally insulated space, which has been evacuated to a degree of vacuum of 0.1 Pa or less, for example.

A plate 46 arranged inside the exhaust port 50 is a member that has been used in a process step (that is a sealing step to be described later) during the manufacturing process of the glass panel unit. Optionally, the exhaust port 50 may be further stuffed with a resin to cover the plate 46.

Figure 3:
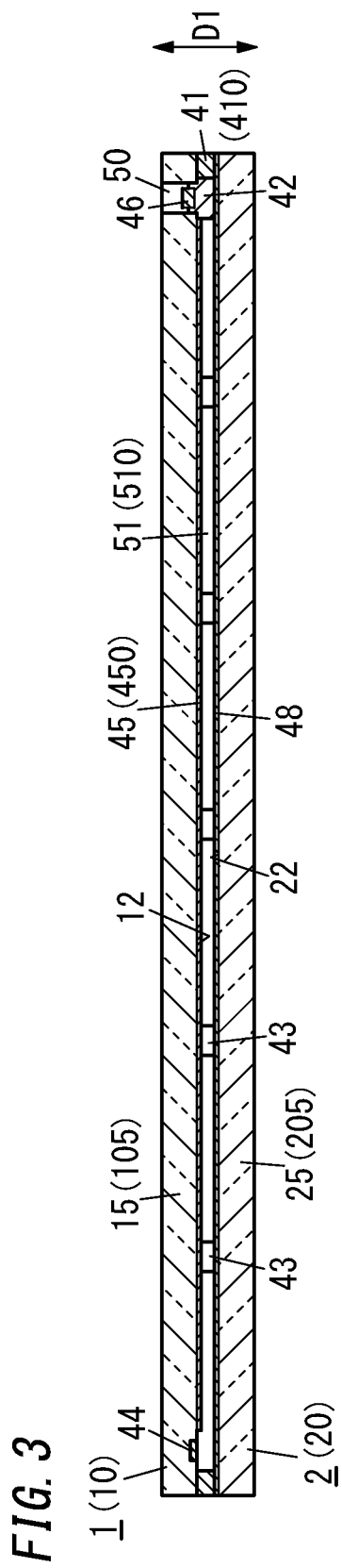
FIG. 3 is a cross-sectional view thereof taken along the plane A-A shown in FIG. 2A.

As shown in FIG. 3, the printed portion 48 is provided on the counter surface 22, facing the exhaust port 50, of the second panel 2. The printed portion 48 is made of a material having a predetermined melting point (softening point) (such as a glass frit according to the first embodiment). The melting point (softening point) of the printed portion 48 is higher than the melting point of the sealing portion 41. In the first embodiment, the melting point of the printed portion 48 is 340° C., which is higher by 75° C. than 265° C. as the melting point of the sealing portion 41 and the port sealing member 42. Furthermore, the melting point of the printed portion 48 is more suitably a temperature higher than 340° C. Note that the respective melting points of the printed portion 48, the sealing portion 41, and the port sealing member 42 are not limited to any specific numerical values. Alternatively, the printed portion 48 may also be made of a material including a ceramic and does not have to be a glass frit. If the printed portion 48 is made of a material including a ceramic, then the melting point of the printed portion 48 is higher than the melting point of the sealing portion 41 made of a glass frit. In addition, making the printed portion 48 of such a material including a ceramic allows the sealing portion 41 made of the glass frit to adhere more easily to the printed portion 48 provided on the second panel 2.

The printed portion 48 has opacity. In the first embodiment, the printed portion 48 includes a pigment such as a black pigment, which is dispersed in the entire printed portion 48, thus rendering the printed portion 48 entirely opaque. However, this is only an example and should not be construed as limiting. Alternatively, the printed portion 48 may have opacity not entirely but mostly and may have a light-transmitting property locally. In that case, the shapes, ratio, and other parameters of the opaque part and the light-transmitting part of the printed portion 48 are not limited to particular ones.

Figure 2A:
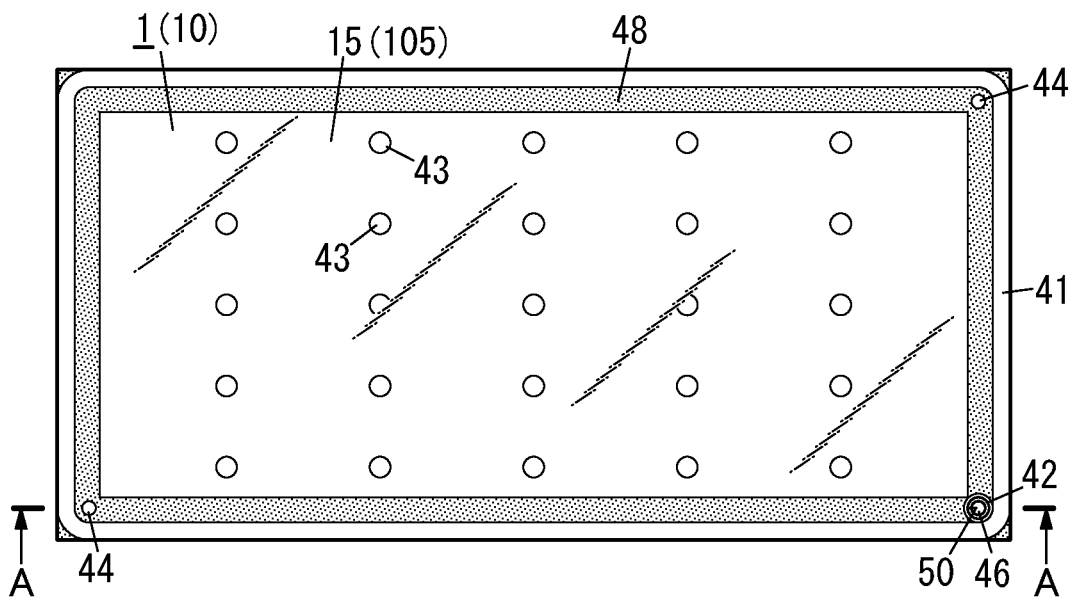
FIG. 2A is a plan view of the glass panel unit (as viewed through a first panel thereof)
Figure 2B:
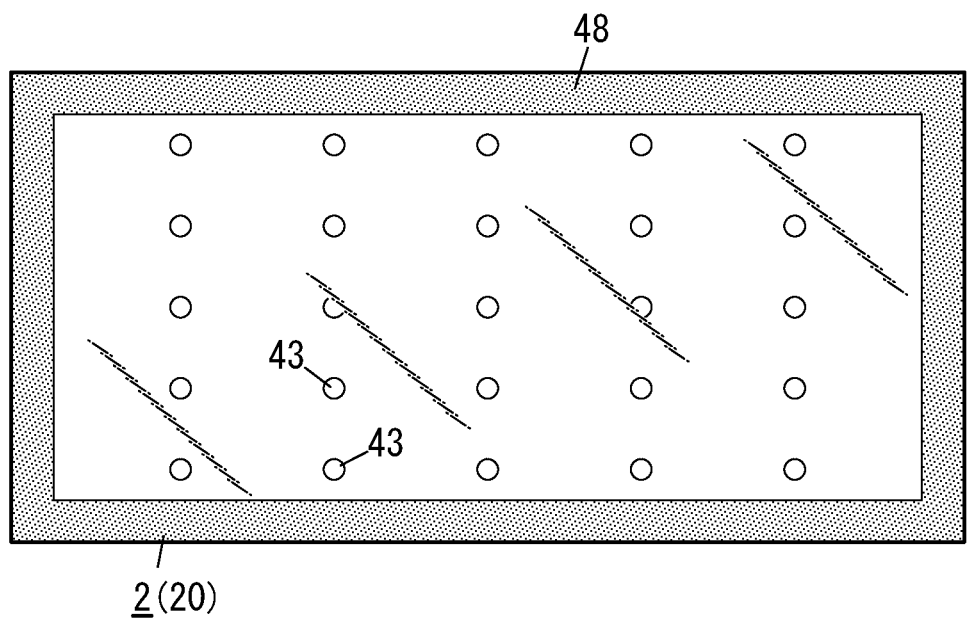
FIG. 2B is a rear view of the glass panel unit (as viewed through a second panel thereof)

In the first embodiment, the printed portion 48 has a predetermined width as measured inward from the edges in a front view of the second panel 2 and a predetermined length as measured along the edges of the second panel 2 as shown in FIG. 2B. In particular, in this first embodiment, the printed portion 48 forms the shape of a frame extending along the entire edges of the second panel 2.

As shown in FIG. 2A, the exhaust port 50 and the gas adsorbent 44 are provided on the surface, facing toward the hermetically sealed space 51, (i.e., the counter surface 12) of a specific area of the first panel 1. The specific area of the first panel 1 faces the printed portion 48.

The printed portion 48 has opacity, and therefore, when the glass panel unit is viewed through the second panel 2, the exhaust port 50, the port sealing member 42, the plate 46, the sealing portion 41, and the gas adsorbent 44 are hidden behind the printed portion 48 and invisible as shown in FIG. 2B. This reduces, when the glass panel unit is viewed through the second panel 2, the chances of the conspicuous exhaust port 50, port sealing member 42, plate 46, sealing portion 41, and gas adsorbent 44 (e.g., the exhaust port 50, among other things) marring the appearance of the glass panel unit.

Note that the port sealing member 42, the sealing portion 41, and the gas adsorbent 44 are not always hidden behind the printed portion 48. In addition, the printed portion 48 does not have to be formed in the frame shape. Rather, the shape, dimensions, number, and other parameters of the printed portion 48 are not limited to particular ones.

Next, a method for manufacturing the glass panel unit according to the first embodiment will be described.

A glass panel unit manufacturing method according to the first embodiment includes a providing step, a pillar placement step, a gas adsorbent arrangement step, a bonding step, an evacuation step, and a sealing step.

Figure 4:
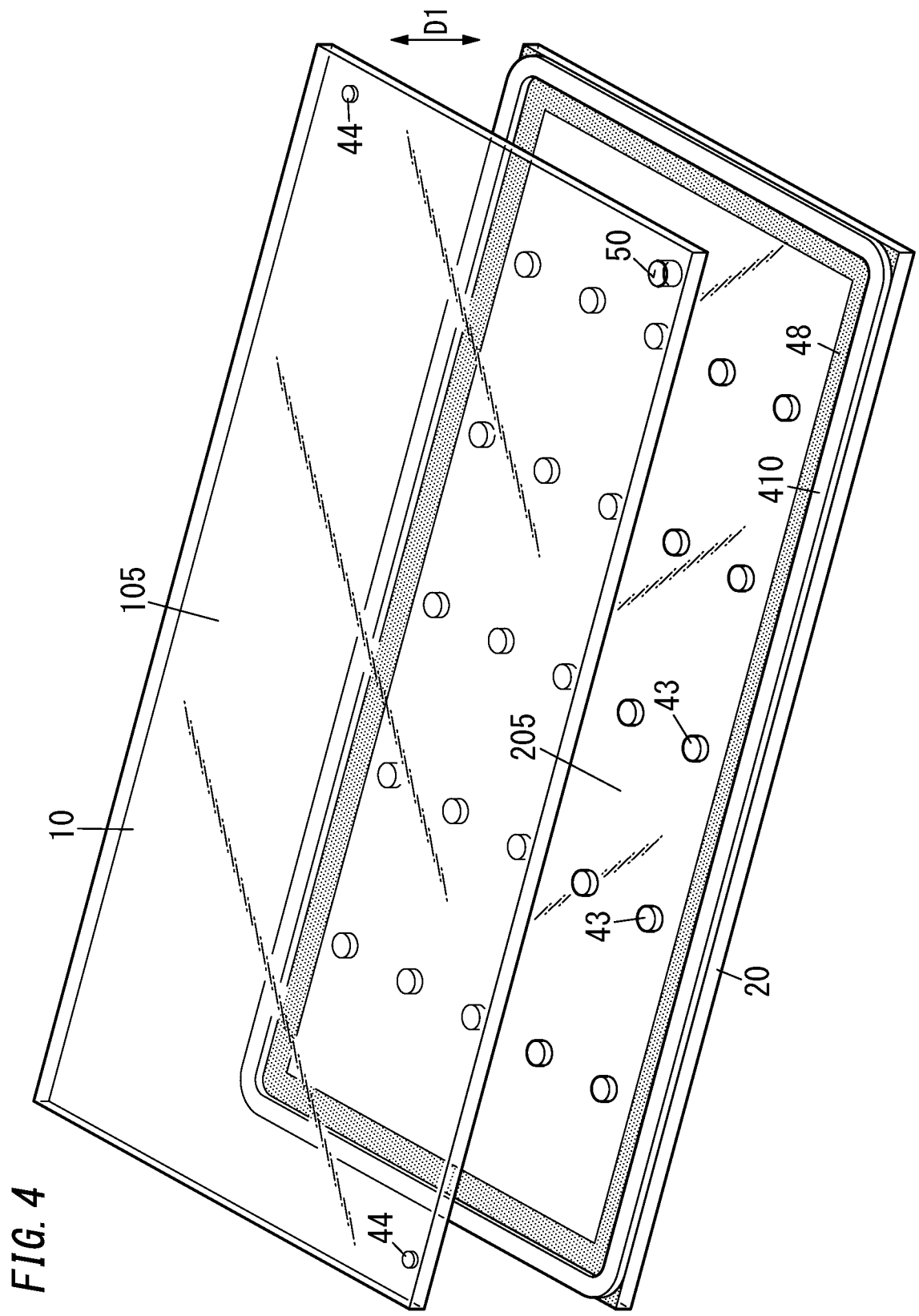
FIG. 4 is a perspective view illustrating a process step for manufacturing the glass panel unit.

As shown in FIG. 4, the providing step includes providing a first substrate 10 and a second substrate 20. The first substrate 10 will constitute the first panel 1 of the glass panel unit when the first substrate 10 goes through respective manufacturing process steps. The second substrate 20 will constitute the second panel 2 of the glass panel unit when the second substrate 20 goes through respective manufacturing process steps.

Figure 6:
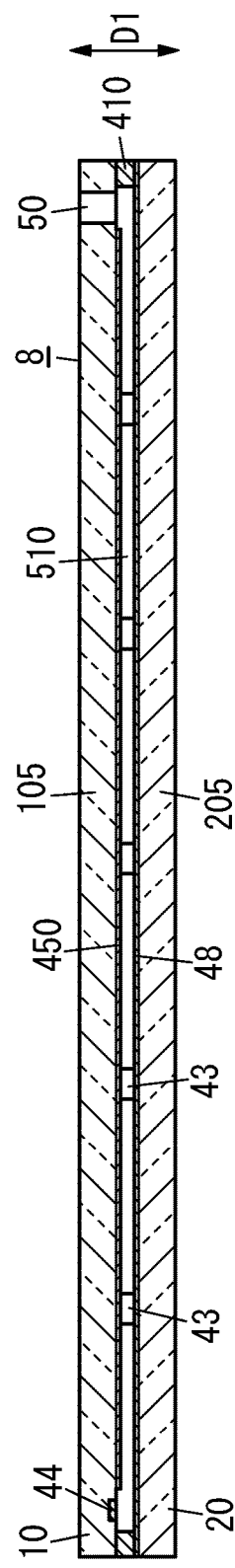
FIG. 6 is a cross-sectional view thereof taken along the plane B-B shown in FIG. 5.

The first substrate 10 includes a glass pane 105 and a low emissivity film 450 stacked on the glass pane 105 (see FIG. 6). The second substrate 20 includes a glass pane 205. In the following description, the glass pane 105 will be hereinafter referred to as a "first glass pane 105" and the glass pane 205 will be hereinafter referred to as a "second glass pane 205."

The first glass pane 105 will constitute the glass pane 15 of the first panel 1 to be obtained through the respective manufacturing process steps. Likewise, the low emissivity film 450 will constitute the low emissivity film 45 of the first panel 1, and the second glass pane 205 will constitute the glass pane 25 of the second panel 2 when these members go through the respective manufacturing process steps.

The pillar placement step includes placing a plurality of (or multiple) pillars 43 on one surface (upper surface) along the thickness D1 of the second substrate 20 such that the pillars 43 are spaced apart from each other as shown in FIG. 4 and other drawings.

The gas adsorbent arrangement step includes arranging the gas adsorbent 44 on one surface (e.g., the lower surface) along the thickness D1 of the first substrate 10. Specifically, a paste of the gas adsorbent 44, containing a getter material, is applied onto the one surface along the thickness D1 of the first substrate 10, using an applicator such as a dispenser.

The getter material contained in the gas adsorbent 44 may be a metallic getter material.

The pillar placement step and the gas adsorbent arrangement step do not have to be performed in this order but may also be performed in reverse order or even in parallel with each other.

The bonding step includes bonding the first substrate 10 and the second substrate 20 together with a sealant 410 in a frame shape. Specifically, the first substrate 10 and the second substrate 20 that have been loaded into a furnace with the sealant 410 and the plurality of pillars 43 interposed between them are heated in the furnace to a first temperature. The first temperature is set at a temperature higher than the melting point of the sealant 410 but lower than the melting point of the printed portion 48, and may be 300° C., for example. This heating step is conducted with the first substrate 10 and second substrate 20, having the sealant 410 and the plurality of pillars 43 thereon, loaded into the furnace. Thereafter, the first substrate 10 and the second substrate 20 with the sealant 410 and the plurality of pillars 43 will be unloaded from the furnace.

Bonding the sealant 410 that has been melted through heating onto the first substrate 10 and the second substrate 20 creates an internal space 510 between the first and second substrates 10 and 20 and the sealing material 410 as shown in FIG. 6. The plurality of pillars 43 and the gas adsorbent 44 are located in the internal space 510. The sealant 410 will constitute the sealing portion 41 of the glass panel unit when the sealant 410 goes through the respective process steps.

In the bonding step, the first substrate 10 and the second substrate 20 are heated to no more than the first temperature that is lower than the melting point of the printed portion 48, thus reducing the chances of the printed portion 48 being melted (softened).

The sealant 410 is applied, using an appropriate applicator, onto an outer peripheral portion of one surface along the thickness D1 of the second substrate 20 (second glass pane 205) to form a frame pattern (see FIG. 4).

The sealant 410 may be arranged before, after, or in parallel with, the pillar placement step. Likewise, the sealant 410 may also be arranged before, after, or in parallel with, the gas adsorbent arrangement step.

Figure 5:
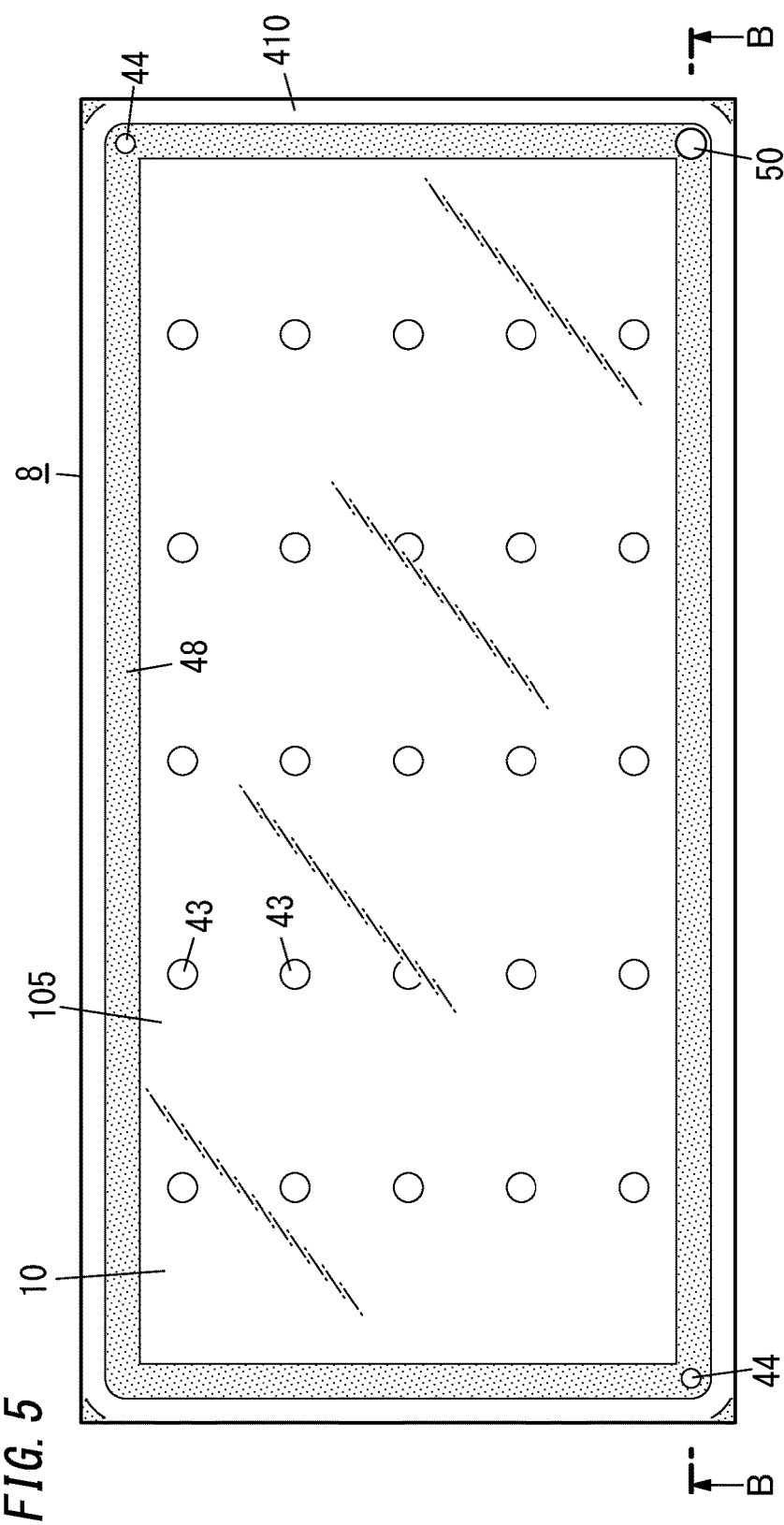
FIG. 5 is a plan view illustrating a work in progress of the glass panel unit.

A work in progress 8 shown in FIGS. 5 and 6 is obtained as a result of these manufacturing process steps. The work in progress 8 is an intermediate product obtained during the manufacturing process of the glass panel unit.

This work in progress 8 will be further subjected to an evacuation step and a sealing step.

Figure 7:
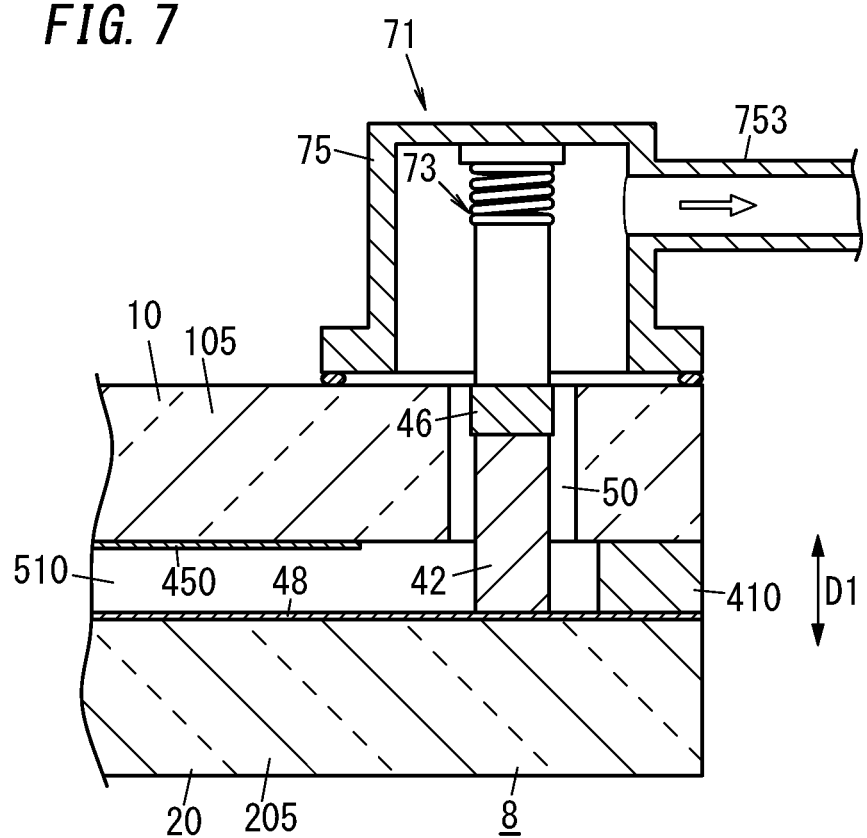
FIG. 7 is a partially cutaway side view of a principal part illustrating how to evacuate an internal space of the work in progress.
Figure 8:
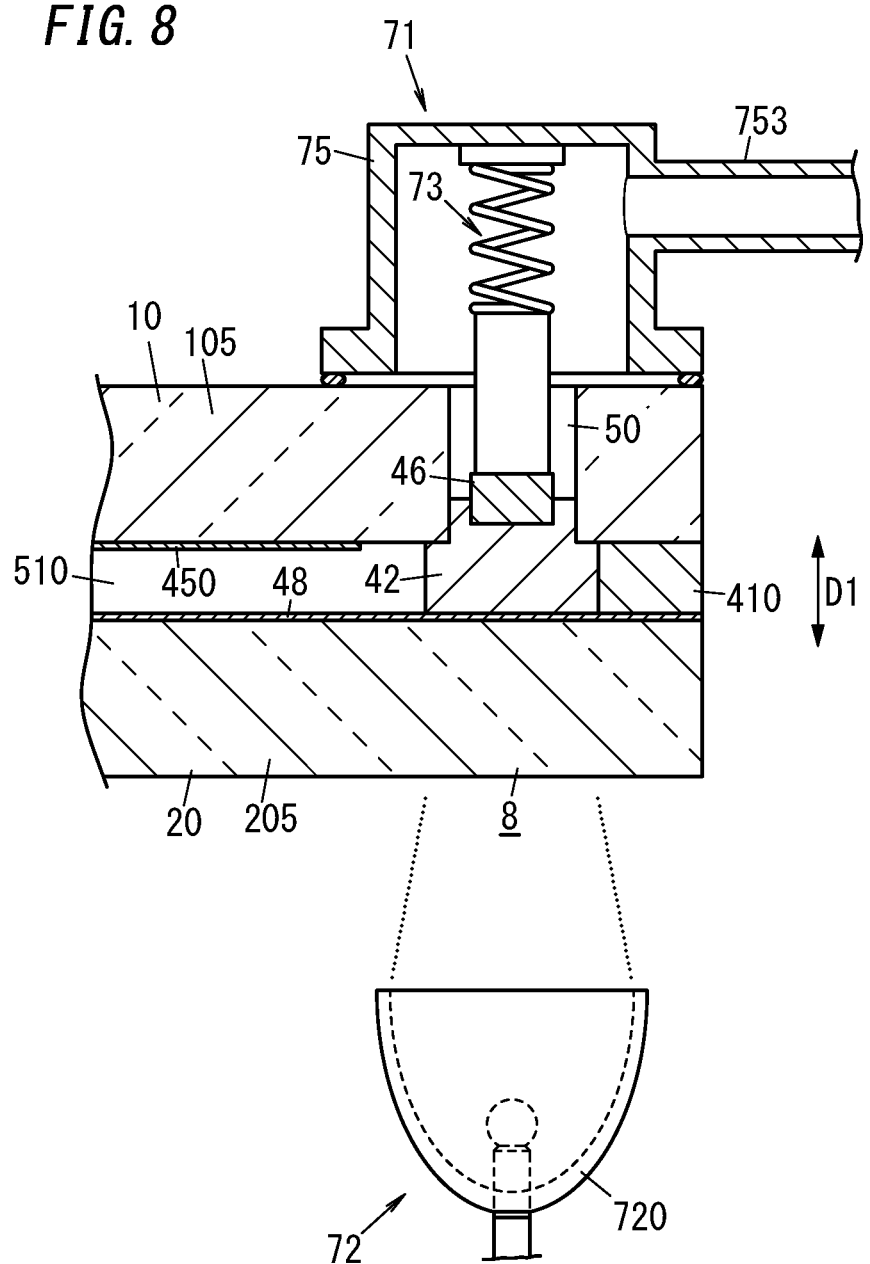
FIG. 8 is a partially cutaway side view of a principal part illustrating how to seal an internal space of the work in progress.

The evacuation step and the sealing step are performed with the system shown in FIGS. 7 and 8. This system includes an evacuation mechanism 71, a heating mechanism 72, and a pressing mechanism 73.

The evacuation mechanism 71 includes: an exhaust head 75 to be pressed against the work in progress 8; and a connection pipe 753 connected to the exhaust head 75. The evacuation mechanism 71 is configured to evacuate, through the exhaust port 50, the internal space 510 created in the work in progress 8 and keep the internal space 510 evacuated.

The heating mechanism 72 is arranged opposite from the exhaust head 75 with respect to the work in progress 8 (see FIG. 8). The heating mechanism 72 is configured to heat the port sealing member 42, inserted into the exhaust port 50, without making physical contact with the port sealing member 42.

The heating mechanism 72 includes an irradiator 720. The irradiator 720 is configured to irradiate the port sealing member 42, inserted into the exhaust port 50, with an infrared ray (e.g., a near-infrared ray) externally incident through the second substrate 20 (second glass pane 205) and thereby heat the port sealing member 42.

The pressing mechanism 73 is provided for the exhaust head 75. The pressing mechanism 73 is configured to press, in a state where the internal space 510 is evacuated by the evacuation mechanism 71, the port sealing member 42 inserted into the exhaust port 50 toward the second substrate 20.

In the evacuation step, the port sealing member 42 and a plate 46, each having a smaller diameter than the exhaust port 50, are inserted into the exhaust port 50 of the work in progress 8 (see FIG. 7). The port sealing member 42 is a solid sealing member made of a glass frit, for example. In this embodiment, the port sealing member 42 has a block shape. However, this is only an example and should not be construed as limiting. Alternatively, the port sealing member 42 may also have the shape of a cylinder with a vertically penetrating through hole. The plate 46 is arranged opposite from the second substrate 20 with respect to the port sealing member 42.

The exhaust head 75 is brought into airtight contact with a region, surrounding the opening formed by the exhaust port 50, of the first substrate 10. At this time, the port sealing member 42 and the plate 46 are pressed elastically toward the second substrate 20.

Exhausting the air in the exhaust head 75 in such a state by vacuum pumping through the connection pipe 753 (as indicated by the open arrow shown in FIG. 7) allows the internal space 510 to be evacuated through the exhaust port 50.

The sealing step includes sealing, using the heating mechanism 72 and the pressing mechanism 73, the internal space 510 while keeping the internal space 510 evacuated.

Specifically, the sealing step includes heating and melting the port sealing member 42 using the heating mechanism 72 and pressing the port sealing member 42 against the second substrate 20 with the biasing force applied by the pressing mechanism 73 via the plate 46. The port sealing member 42 is deformed in the internal space 510.

This allows the exhaust port 50 to be closed with the port sealing member 42, thus hermetically sealing the internal space 510 while keeping the internal space 510 evacuated. This internal space 510 will constitute the hermetically sealed space 51 of the glass panel unit when the internal space goes through the respective process steps.

Optionally, an activation step may be performed after that. The activation step includes locally heating the gas adsorbent 44, arranged in the internal space 510 of the work in progress 8, using a local heating mechanism, for example. The activation step is suitably carried out in parallel with the evacuation step. That is to say, while the internal space 510 is being evacuated using the exhaust head 75, the gas adsorbent 44 is suitably heated locally by a contactless technique and activated in the evacuated internal space 510. Alternatively, the gas adsorbent 44 may also be locally heated in the activation step after the sealing step has been performed. In that case, the internal space 510 that has been sealed in the evacuated state is irradiated with a laser beam and locally heated, thereby activating the gas adsorbent 44.

The glass panel unit obtained by the manufacturing method described above has the hermetically sealed space 51 that has been sealed in the evacuated state and a sufficiently activated gas adsorbent 44 is housed in the hermetically sealed space 51. This curbs a decline in the degree of vacuum of the hermetically sealed space 51, thus maintaining the thermal insulation properties of the overall glass panel unit.

Optionally, the respective constituent elements of the glass panel unit described above and the respective manufacturing process steps of the glass panel unit may be modified in various manners as appropriate depending on a design choice or any other factor.

For example, a plurality of glass panel units may be obtained by further dividing, by a so-called "sectioning technique," the glass panel unit that has been formed by the same method as the one described above. In that case, partitions to divide the hermetically sealed space 51 into multiple spaces are provided between the first substrate 10 and the second substrate 20.

When sectioning is performed, a section of the first substrate 10 that has been used during the manufacturing process will constitute the first panel 1 of the glass panel unit as a final product. Likewise, a section of the second substrate 20 that has been used during the manufacturing process will constitute the second panel 2 of the glass panel unit as a final product and a section of the sealant 410 will constitute the sealing portion 41 of the glass panel unit as a final product.

In the glass panel unit manufacturing method described above, the plurality of pillars 43 are placed on the one surface of the second substrate 20 in the pillar placement step. However, the plurality of pillars 43 may be placed on at least one of the first and second substrates 10, 20. That is to say, the plurality of pillars 43 may be placed on the first substrate 10 or may be distributed on the first substrate 10 and the second substrate 20.

In the glass panel unit manufacturing method described above, the gas adsorbent 44 is irradiated, in the activation step, with a laser beam through the second substrate 20. However, this is only an example and should not be construed as limiting. Rather, the gas adsorbent 44 may be irradiated with the laser beam through at least one of the first substrate 10 or the second substrate 20. When the gas adsorbent 44 is irradiated with a laser beam through the first substrate 10, the first substrate 10 suitably includes no low emissivity film 450.

Figure 9A:
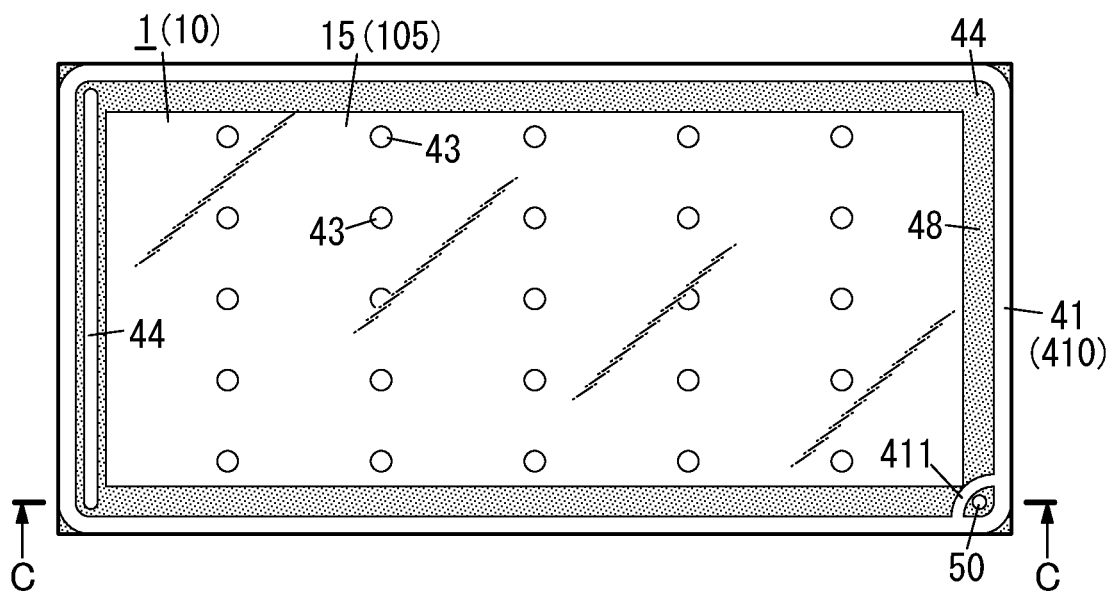
FIG. 9A is a plan view of a glass panel unit according to a second embodiment.
Figure 9B:
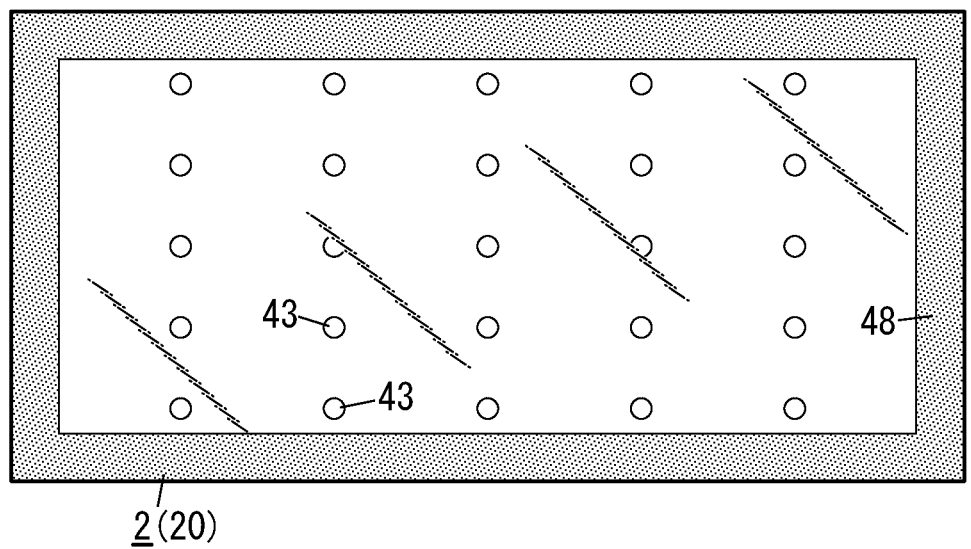
FIG. 9B is a rear view of the glass panel unit.

Next, a glass panel unit according to a second embodiment will be described with reference to FIGS. 9A, 9B, and 10. Note that the glass panel unit according to the second embodiment has mostly the same configuration as the glass panel unit according to the first embodiment. Thus, their common features will not be described all over again to avoid redundancies.

The glass panel unit according to the second embodiment uses annealed glass. The exhaust port 50 is isolated from the hermetically sealed space 51 by isolating a region surrounding the exhaust port 50 with a sealing portion 411. The printed portion 48 is provided on the surface, facing toward the hermetically sealed space 51, of a specific area of the second substrate 20. The specific area of the second substrate 20 faces the sealing portion 41 and the exhaust port 50. Since the exhaust port 50 is isolated from the hermetically sealed space 51 in this embodiment, the port sealing member 42 (and the plate 46) may be eliminated.

In the second embodiment, the melting point (softening point) of the sealing portion 41 is 420° C. and the melting point (softening point) of the printed portion 48 is 520° C., which is higher by 100° C. than 420° C. as the melting point of the sealing portion 41.

The gas adsorbent 44 applied linearly is a non-metallic getter material with a porous structure. Examples of the non-metallic getter materials include zeolite-based, active carbon, and magnesium oxide getter materials. The zeolite-based getter materials include an ion exchanged zeolite. Examples of ion exchange materials include K, $NH_4$, Ba, Sr, Na, Ca, Fe, Al, Mg, Li, H, and Cu. These are metallic getter materials.

The gas adsorbent 44 contains the non-metallic getter material with the porous structure, and therefore, is able to effectively adsorb gas molecules of a hydrocarbon based gas (such as $CH_4$ or $C_2H_6$) or an ammonia gas ($NH_3$).

The glass panel unit according to the second embodiment achieves the same advantages as the glass panel unit according to the first embodiment does.

Next, a glass panel unit according to a third embodiment will be described with reference to FIG. 11.

In the third embodiment, the glass panel unit is warped, which is a major difference from the first and second embodiments.

The glass panel unit is warped along the longitudinal axis thereof to have a predetermined curvature (or radius of curvature). On the other hand, the glass panel unit is not warped along the latitudinal axis thereof and its surface is straight.

The glass panel unit according to the third embodiment achieves the same advantages as the glass panel units according to the first and second embodiments. In addition, the third embodiment also facilitates arranging glass panel units onto a curved surface so that the respective surfaces of the glass panel units are continuous with each other.

FIGS. 12 and 13 illustrate a glass panel unit according to a fourth embodiment. The glass panel unit according to the fourth embodiment includes not only the first panel 1 and second panel 2 of the glass panel unit shown in FIGS. 1-3 but also a third panel 3 as well.

In the glass panel unit according to the fourth embodiment, the third panel 3 is laid on top of the first panel 1 to face the first panel 1, and a hermetically sealed space 52 is created between the first panel 1 and the third panel 3. Note that this arrangement of the third panel 3 is only an example. Alternatively, the third panel 3 may be laid on top of the second panel 2, and a hermetically sealed space 52 may be created between the second panel 2 and the third panel 3.

The third panel 3 includes at least a glass pane 35. Optionally, the third panel 3 may have an appropriate coating.

Between the respective peripheral edge portions of the third panel 3 and first panel 1, interposed are a frame-shaped spacer 34 with a hollow portion and a second sealing portion 38 formed in the shape of a frame covering the outer surfaces of the spacer 34. The hollow portion of the spacer 34 is filled with a desiccant 36. The space 52 is a space which is hermetically sealed by being surrounded with the third panel 3, the first panel 1, the second sealing portion 38, and the spacer 34.

The spacer 34 is made of a metal such as aluminum and has vent holes 341 provided through inner peripheral portions thereof. The hollow portion of the spacer 34 communicates with the space 52 through the vent holes 341. The desiccant 36 may be a silica gel, for example. The second sealing portion 38 is suitably made of a highly airtight resin such as silicone resin or butyl rubber and hermetically bonded to the third panel 3 and the first panel 1. The space 52 is filled with a dry gas (e.g., a dry rare gas such as argon gas or dry air).

A method for manufacturing the glass panel unit according to the fourth embodiment includes not only all of the process steps described above but also a second bonding step as well. The second bonding step includes hermetically bonding the first panel 1 and the third panel 3 (or the second panel 2 and the third panel 3) together via the second sealing portion 38 with the spacer 34 interposed between them.

(Glass Window)

Next, a glass window according to a fifth embodiment will be described. The glass window according to the fifth embodiment includes the glass panel unit according to the first or fourth embodiment.

Figure 14:
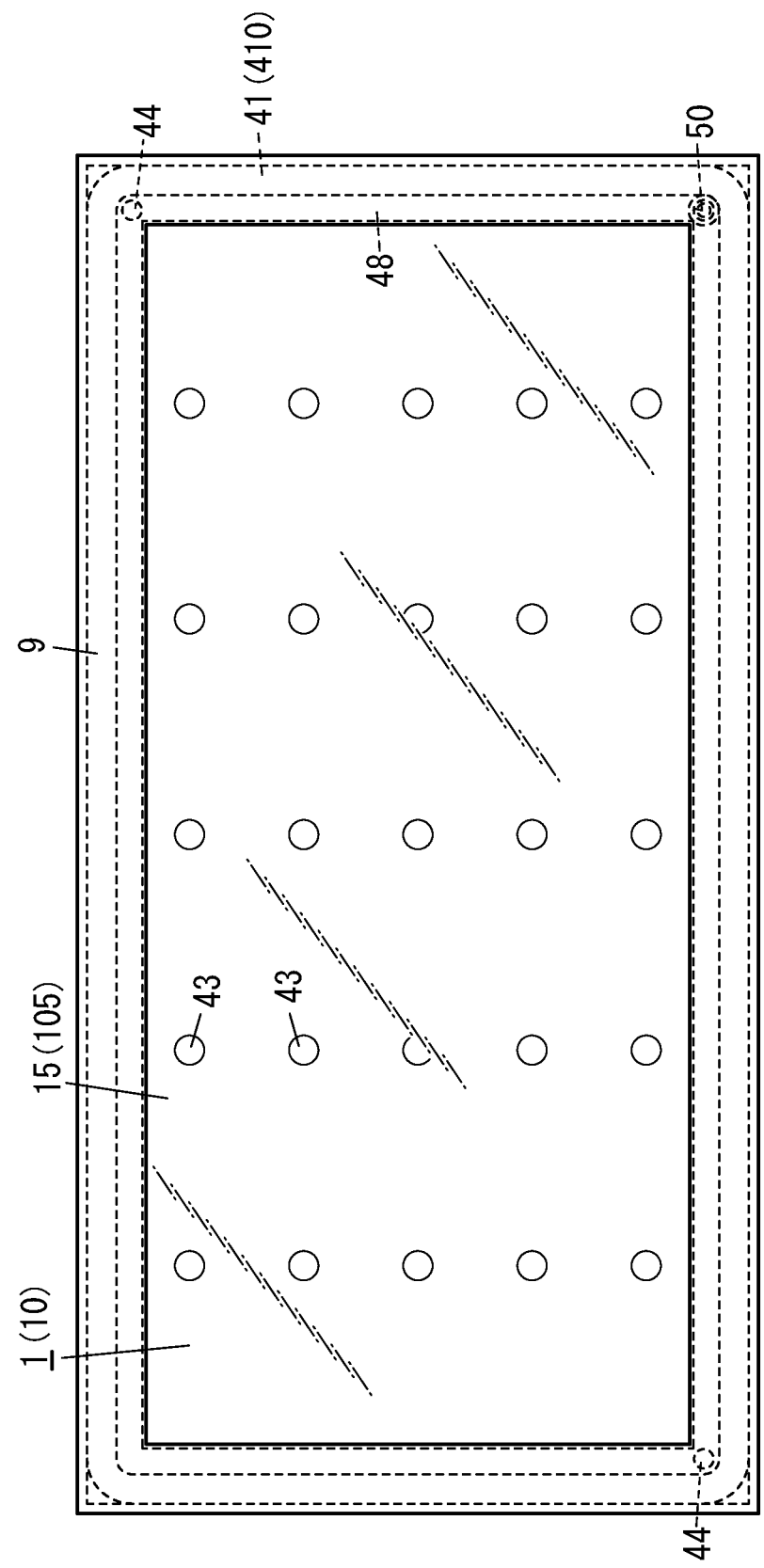
FIG. 14 is a plan view of a glass window according to a fifth embodiment.

FIG. 14 illustrates a glass window including the glass panel unit according to the first embodiment. In this glass window, the peripheral edge portions of the glass panel unit shown in FIGS. 1-3 are fitted into a frame 9.

For example, the frame 9 may be a window frame. In that case, the glass window shown in FIG. 14 is a glass window including the glass panel unit according to the first embodiment. The glass window does not have to be an openable window but may also be a fixed window such as a show window.

Furthermore, examples of glass windows including the glass panel unit according to the first embodiment include not only glass windows but also other glazing for entrance doors and interior doors as well.

A method for manufacturing a glass window including the glass panel unit according to the first embodiment includes not only the respective process steps of the method for manufacturing the glass panel unit according to the first embodiment but also an assembling step as well. The assembling step includes fitting the rectangular frame 9 onto peripheral edge portions of the glass panel unit. A glass window manufactured through these process steps exhibits excellent thermal insulation properties.

In the glass window shown in FIG. 14, the frame 9 is fitted onto the glass panel unit shown in FIGS. 1-3. However, the frame 9 is not necessarily fitted onto that glass panel unit. Alternatively, the frame 9 may also be fitted onto a glass panel unit obtained by the sectioning technique described above, for example.

Some embodiments of a glass panel unit and a glass window including the glass panel unit have been described. Note that the glass panel unit and glass window including the glass panel unit do not have to be implemented as shown in the accompanying drawings but may also be modified in various manners as appropriate depending on a design choice or any other factor.

Optionally, the printed portion 48 may also be provided for the surface, facing toward the hermetically sealed space 51, of the one panel with the exhaust port 50 so as to be superposed on the exhaust port 50. This renders the exhaust port 50 much less conspicuous even when the glass panel unit is viewed through the one panel with the exhaust port 50. Even so, this further reduces the chances of the printed portion 48, which is superposed on the gas adsorbent 44 or formed in a frame shape, marring the appearance of the glass panel unit.

Furthermore, in the first through fifth embodiments described above, the printed portion 48 is provided on one surface, facing toward the hermetically sealed space 51, of a specific area of the other panel (e.g., the second panel 2 in the first through fifth embodiments), out of the first and second panels 1, 2, such that the specific area faces the exhaust port 50. Alternatively, the printed portion 48 may also be provided on the opposite surface, facing away from the hermetically sealed space 51, of the specific area of the other panel (e.g., the second panel 2), out of the first and second panels 1, 2, such that the specific area faces the exhaust port 50.

(Advantages)

As can be seen from the foregoing description of embodiments, a glass panel unit according to a first aspect includes: a first panel (1) including a glass pane (15); a second panel (2) including another glass pane (25); a sealing portion (41); an exhaust port (50); and a printed portion (48). The second panel (2) is arranged to face the first panel (1). The sealing portion (41) is formed in a frame shape and hermetically bonds respective peripheral edge portions of the first and second panels (1, 2) to create an evacuated, hermetically sealed space (51) between the first panel (1) and the second panel (2). The exhaust port (50) is provided for one panel selected from the group consisting of the first and second panels (1, 2). The printed portion (48) is provided for the other panel selected from the group consisting of the first and second panels (1, 2). The printed portion (48) is located in an area, facing the exhaust port (50), of one surface of the other panel. The one surface either faces toward, or faces away from, the hermetically sealed space (51).

According to the first aspect, when the glass panel unit is viewed through the second panel (2), the exhaust port (50) is rendered much less conspicuous by being hidden behind the printed portion (48), thus reducing the chances of the conspicuous exhaust port (50) marring the appearance of the glass panel unit.

A second aspect may be implemented in combination with the first aspect. In the second aspect, the sealing portion (41) and the printed portion (48) are made of two different materials, each of which has a predetermined melting point (softening point). The printed portion (48) has a higher melting point than the sealing portion (41).

The second aspect reduces the chances of the printed portion (48) being melted while the respective peripheral edge portions of the first and second panels (1, 2) are hermetically bonded together by melting the sealing portion (41).

A third aspect may be implemented in combination with the first or second aspect. In the third aspect, the printed portion (48) is made of a material including a ceramic.

The third aspect easily makes the melting point of the printed portion (48) higher than the melting point of the sealing portion (41).

A fourth aspect may be implemented in combination with any one of the first to third aspects. In the fourth aspect, the glass panel unit further includes a gas adsorbent (44) provided on one surface, facing toward the hermetically sealed space (51), of the one panel. The printed portion (48) has a predetermined width and a predetermined length. The predetermined width is measured inward from an edge in a front view of the other panel. The predetermined length is measured along the edge of the other panel. The exhaust port (50) and the gas adsorbent (44) are located in an area of the one surface, facing toward the hermetically sealed space (51), of the one panel. The area of the one surface of the one panel faces the printed portion (48) having the predetermined width and the predetermined length.

According to the fourth aspect, not only the exhaust port (50) but also the gas adsorbent (44) are rendered much less conspicuous by being hidden behind the printed portion (48).

A fifth aspect may be implemented in combination with any one of the first to fourth aspects. In the fifth aspect, the printed portion (48) is formed in a shape of a frame having a predetermined width as measured inward from edges in a front view of the other panel and extending along the edges in their entirety.

The fifth aspect makes the printed portion (48) look like a frame, thus improving the appearance of the glass panel unit.

A sixth aspect may be implemented in combination with any one of the first to fifth aspects. In the sixth aspect, the glass panel unit further includes a low emissivity film (45) formed on the one surface, facing toward the hermetically sealed space (51), of the one panel.

The sixth aspect reduces the transfer of heat through heat radiation caused by the glass panel unit.

A seventh aspect may be implemented in combination with any one of the first to sixth aspects. In the seventh aspect, the glass panel unit further includes a third panel (3) and a second sealing portion (38). The third panel (3) includes still another glass pane (35) and is arranged to face an arbitrary panel selected from the group consisting of the first and second panels (1, 2). The second sealing portion (38) is formed in a frame shape and is hermetically bonded to the arbitrary panel and the third panel (3) to create another hermetically sealed space (52) between the arbitrary panel and the third panel (3).

The seventh aspect provides a glass panel unit with further improved thermal insulation properties.

An eighth aspect may be implemented in combination with any one of the first to seventh aspects. In the eighth aspect, a glass window includes the glass panel unit according to any one of the first to seventh aspects; and a window frame (9) into which peripheral edge portions of the glass panel unit are fitted.

The eighth aspect provides a glass window in which the exhaust port (50) is rendered much less conspicuous by being hidden behind the printed portion (48) when viewed through the second panel (2).

REFERENCE SIGNS LIST

1 First Panel
15 Glass Pane
2 Second Panel
25 Glass Pane
3 Third Panel
38 Second Sealing Portion
41 Sealing Portion
44 Gas Adsorbent
45 Low-Emissivity Film
48 Printed Portion
50 Exhaust Port
51 Hermetically Sealed Space
52 Space
9 Frame

The invention claimed is:
1. A glass panel unit comprising:
a first panel including a first glass pane;
a second panel including a second glass pane and arranged to face the first panel;
a sealing portion formed in a frame shape and hermetically bonding respective peripheral edge portions of the first and second panels to create an evacuated, hermetically sealed space between the first panel and the second panel;

an exhaust port provided for one panel selected from the group consisting of the first and second panels; and a printed portion provided for an other panel selected from the group consisting of the first and second panels, the other panel not having the exhaust port, the printed portion being located in an area, facing the exhaust port, of one surface of the other panel, the one surface either facing toward, or facing away from, the hermetically sealed space, the printed portion being formed in a shape of a frame having a predetermined width as measured inward from edges in a front view of the other panel and extending along the edges in their entirety, wherein, the printed portion has opacity and when the glass panel unit is viewed through the other panel, the exhaust port and the sealing portion are hidden behind the printed portion and are invisible.

2. The glass panel unit of claim 1, wherein
the sealing portion and the printed portion are made of two different materials, each of the two different materials having a predetermined melting point, and
the printed portion has a higher melting point than the sealing portion.

3. The glass panel unit of claim 1, wherein
the printed portion is made of a material including a ceramic.

4. The glass panel unit of claim 1, further comprising a gas adsorbent provided on a counter surface, facing toward the hermetically sealed space, of the one panel, wherein the printed portion has a predetermined length, the predetermined length being measured along the edge of the other panel, and the exhaust port and the gas adsorbent are located in an area of the counter surface of the one panel, the area of the counter surface of the one panel facing the printed portion.

5. The glass panel unit of claim 1, further comprising a low emissivity film formed on a counter surface of the one panel.

6. The glass panel unit of claim 1, further comprising:
a third panel including a third glass pane and arranged to face an arbitrary panel selected from the group consisting of the first and second panels; and
a second sealing portion formed in a frame shape and hermetically bonded to the arbitrary panel and the third panel to create another hermetically sealed space between the arbitrary panel and the third panel.

7. A glass window comprising:
the glass panel unit of claim 1; and
a window frame into which peripheral edge portions of the glass panel unit are fitted.

* * * * *